United States Patent
Kesselaar et al.

(10) Patent No.: US 11,519,541 B2
(45) Date of Patent: Dec. 6, 2022

(54) TUBE RETAINERS, TUBE RETAINER SETS, AND TUBE MANAGEMENT SYSTEMS

(71) Applicant: Pall Corporation, Port Washington, NY (US)

(72) Inventors: Daniel Kesselaar, Southampton (GB); Thomas J. Hartridge, Havant (GB)

(73) Assignee: Pall Corporation, Port Washington, NY (US)

( * ) Notice: Subject to any disclaimer, the term of this patent is extended or adjusted under 35 U.S.C. 154(b) by 206 days.

(21) Appl. No.: 16/832,616

(22) Filed: Mar. 27, 2020

(65) Prior Publication Data
US 2021/0301962 A1   Sep. 30, 2021

(51) Int. Cl.
*F16L 37/14* (2006.01)
*F16L 3/22* (2006.01)
*F16L 3/227* (2006.01)

(52) U.S. Cl.
CPC .............. *F16L 37/144* (2013.01); *F16L 3/22* (2013.01); *F16L 3/222* (2013.01); *F16L 3/227* (2013.01); *F16L 3/221* (2013.01)

(58) Field of Classification Search
CPC . F16L 37/144; F16L 3/22; F16L 3/222; F16L 3/227; F16L 3/221; F16L 3/24; F16L 3/08; F16L 3/13; F16M 13/02
See application file for complete search history.

(56) References Cited

U.S. PATENT DOCUMENTS

| | | | |
|---|---|---|---|
| 3,917,318 A | 11/1975 | Legris | |
| 4,907,766 A * | 3/1990 | Rinderer | F16L 3/243 248/57 |
| 5,653,411 A | 8/1997 | Picco et al. | |
| 8,475,226 B2 | 7/2013 | Comfort | |
| 2009/0224111 A1* | 9/2009 | Gilbreath | F16L 3/222 248/68.1 |
| 2009/0250559 A1 | 10/2009 | Benoit et al. | |
| 2013/0053812 A1 | 2/2013 | Lehmann et al. | |
| 2015/0337992 A1* | 11/2015 | McCarter | F16L 3/24 248/65 |
| 2015/0377387 A1 | 12/2015 | Meyers et al. | |
| 2017/0122462 A1 | 5/2017 | Langenbacher | |
| 2017/0258984 A1* | 9/2017 | Meyer | A61M 5/1418 |

(Continued)

FOREIGN PATENT DOCUMENTS

| | | |
|---|---|---|
| CA | 3 126 632 A1 | 1/2020 |
| CN | 1119253 A | 3/1996 |
| DE | 3824197 A1 * | 1/1990 |

(Continued)

OTHER PUBLICATIONS

European Patent Office, Extended European Search Report in counterpart European Patent Application No. 21159290.2, dated Aug. 13, 2021.

(Continued)

*Primary Examiner* — Terrell L McKinnon
*Assistant Examiner* — Ding Y Tan
(74) *Attorney, Agent, or Firm* — Leydig, Voit & Mayer, Ltd.

(57) ABSTRACT

Tube retainers, tube retainer sets, and tube management systems comprising blocks with male and female block connectors, and methods of assembling and using the tube retainers, sets, and systems, are disclosed.

7 Claims, 8 Drawing Sheets

(56) References Cited

U.S. PATENT DOCUMENTS

2018/0266588 A1\* 9/2018 Netke ............... F16L 55/02
2021/0301949 A1 9/2021 Kesselaar et al.

FOREIGN PATENT DOCUMENTS

| DE | 3824197 A1 | 1/1990 | |
|---|---|---|---|
| DE | 20 2019 100 169 U1 | 4/2020 | |
| DE | 102019101180 A1 \* | 7/2020 | |
| EP | 1061302 B1 \* | 12/2003 | ............. F16L 3/222 |
| JP | H7-280139 A | 10/1995 | |
| JP | H10-227374 A | 8/1998 | |
| WO | WO-2018151613 A1 \* | 8/2018 | ............. H02G 3/263 |

OTHER PUBLICATIONS

Singapore Intellectual Property Office, Search Report issued in counterpart Singapore Patent Application No. 10202102214X, dated Apr. 28, 2022.
Japan Patent Office, Office Action issued in counterpart Japanese Patent Application No. 2021-027355, dated Mar. 8, 2022.
China National Intellectual Property Administration, Office Action issued in counterpart Chinese Patent Application No. 202110323079.1, dated Jul. 12, 2022.

\* cited by examiner

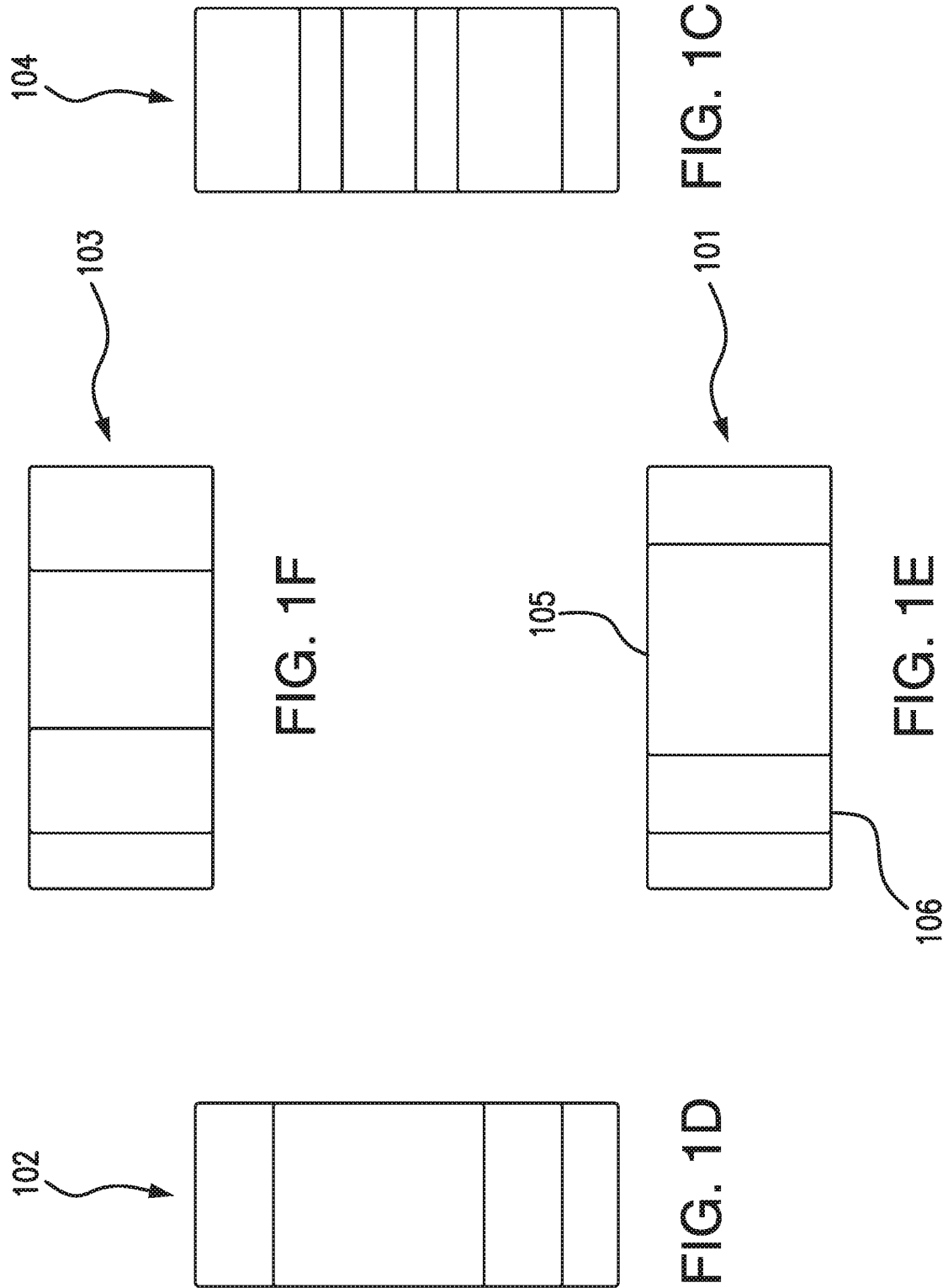

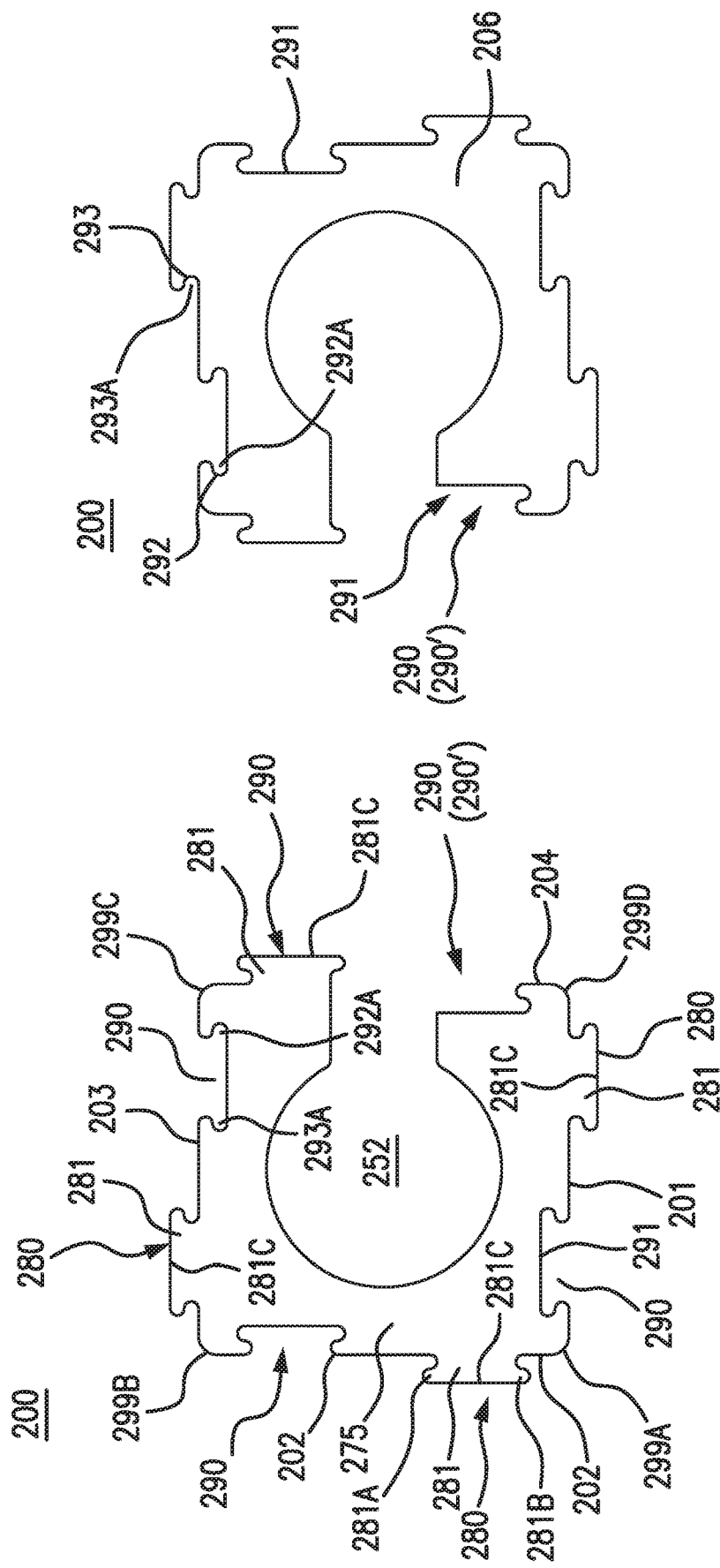

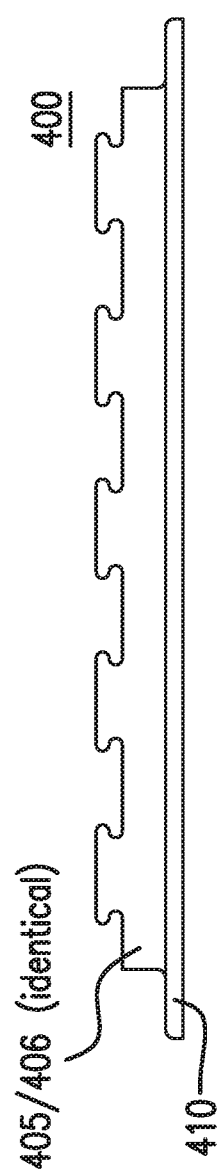
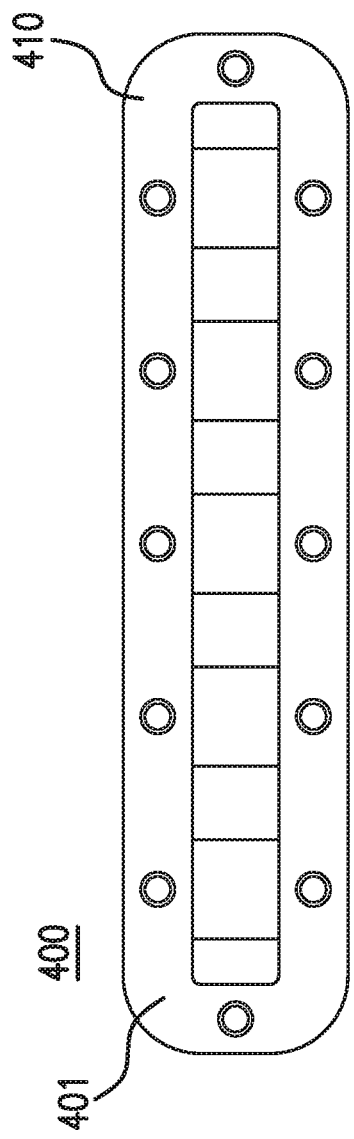
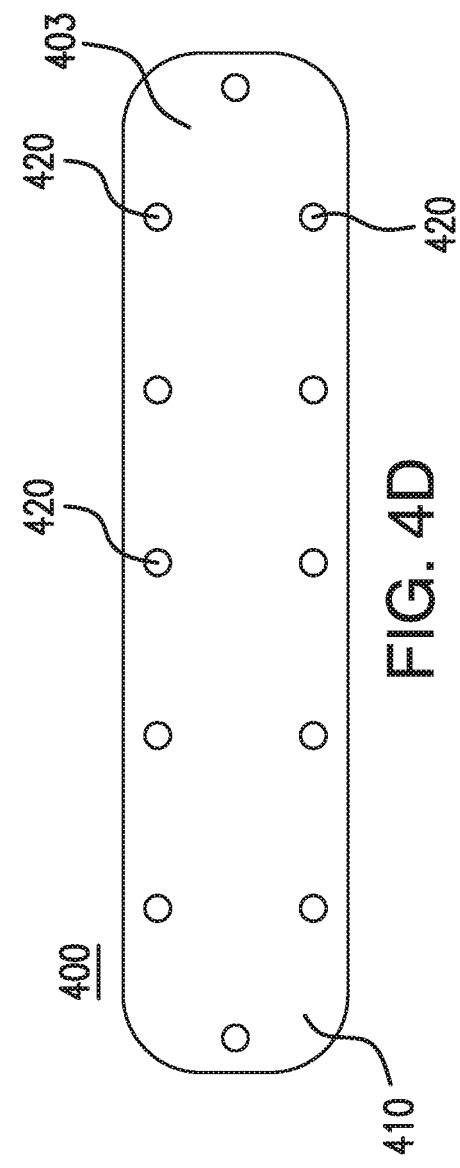
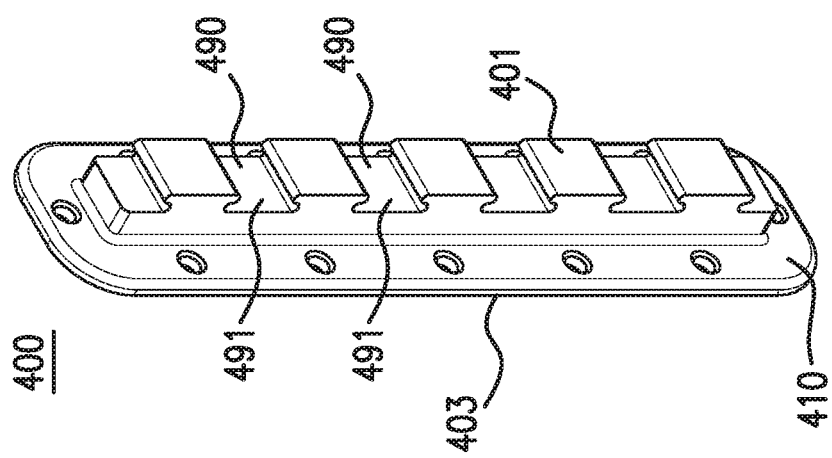
FIG. 4B
FIG. 4C
FIG. 4D
FIG. 4A

TUBE RETAINERS, TUBE RETAINER SETS, AND TUBE MANAGEMENT SYSTEMS

BACKGROUND OF THE INVENTION

Systems including tubing such as bioprocessing systems, particularly single-use systems, typically utilize flexible tubing to provide fluid communication between various components and for connecting fluid processes. The systems can include a number of tubes and/or a variety of tubes having different inside and/or outside diameters.

The present invention provides for ameliorating at least some of the disadvantages of the prior art. These and other advantages of the present invention will be apparent from the description as set forth below.

BRIEF SUMMARY OF THE INVENTION

An embodiment of the invention provides a tube retainer comprising a block comprising a top wall; a bottom wall; a first side wall; a second side wall; a third side wall; and a fourth side wall; a first opening comprising a tube slot having a first slot end and a second slot end, and a second opening having a generally annular shape, the first opening communicating with the second opening, the first and second openings passing through the top wall and the bottom wall; wherein at least the first side wall and the second side wall each include a male block connector comprising an outwardly extending member having a first rounded end and a second rounded end, the first rounded end and the second rounded end facing in opposite directions and being spaced from and arranged generally parallel to, the respective side wall; and/or a female block connector comprising a recess comprising a first pocket having an open end and a closed end, and a second pocket having an open end and a closed end, wherein the first pocket and the second pocket are arranged generally parallel to the respective side wall, and the open end of the first pocket faces the open end of the second pocket; wherein the third wall or the fourth wall includes the first slot end of the tube slot.

In some embodiments of the tube retainer, the first side wall and the second side wall each include a male block connector and a female block connector.

Another embodiment of the invention provides a tube retainer set comprising at least first and second tube retainers.

Yet another embodiment of the invention relates to a tube retainer management system comprising at least one tube retainer, preferably, at least one tube retainer set, interlockable with a mounting bar.

In other embodiments, methods of assembling and using the tube retainers, tube retainer sets, and tubing retainer management systems, are provided.

BRIEF DESCRIPTION OF THE SEVERAL VIEWS OF THE DRAWING(S)

FIGS. 1A-1F illustrate a tube retainer comprising first and second side walls each including a male block connector comprising an outwardly extending member having a first rounded end and a second rounded end, and third and fourth side walls each including a female block connector comprising a recess comprising a first pocket and a second pocket according to an embodiment of the invention. FIG. 1A shows a top view, FIG. 1B shows a bottom view, FIG. 1C shows a right side view, FIG. 1D shows a left side view, FIG. 1E shows a front view and FIG. 1F shows a rear view.

FIGS. 2A-2F illustrate a tube retainer comprising first, second, third, and fourth side walls each including a male block connector comprising an outwardly extending member having a first rounded end and a second rounded end, wherein the first, second and third side walls each also include a female block connector comprising a recess comprising a first pocket and a second pocket according to an embodiment of the invention. FIG. 2A shows a top view, FIG. 2B shows a bottom view, FIG. 2C shows a right side view, FIG. 2D shows a left side view, FIG. 2E shows a front view and FIG. 2F shows a rear view.

FIG. 3A shows a top view of a tube retainer set comprising two tube retainers as shown in FIGS. 1A-1F interlocked together, and two tube retainers as shown in FIGS. 2A-2F separately interlocked with the pair of tube retainers as shown in FIGS. 1A-1F. FIG. 3B shows a top view of a tube retainer set comprising two tube retainers as shown in FIGS. 2A-2F interlocked together, and two tube retainers as shown in FIGS. 1A-1F separately interlocked with individual tube retainers as shown in FIGS. 2A-2F, according to an embodiment of the invention.

FIGS. 4A-4D shows a mounting bar for the tube retainers as shown in FIGS. 1A-1E and 2A-2E and the tube retainer sets shown in FIGS. 3A and 3B according to an embodiment of the invention. FIG. 4A shows a front perspective view, FIG. 4B shows a top view (wherein the bottom view is identical to the top view), FIG. 4C shows a front view, and FIG. 4D shows a rear view.

DETAILED DESCRIPTION OF THE INVENTION

Figures 1A, 1B:
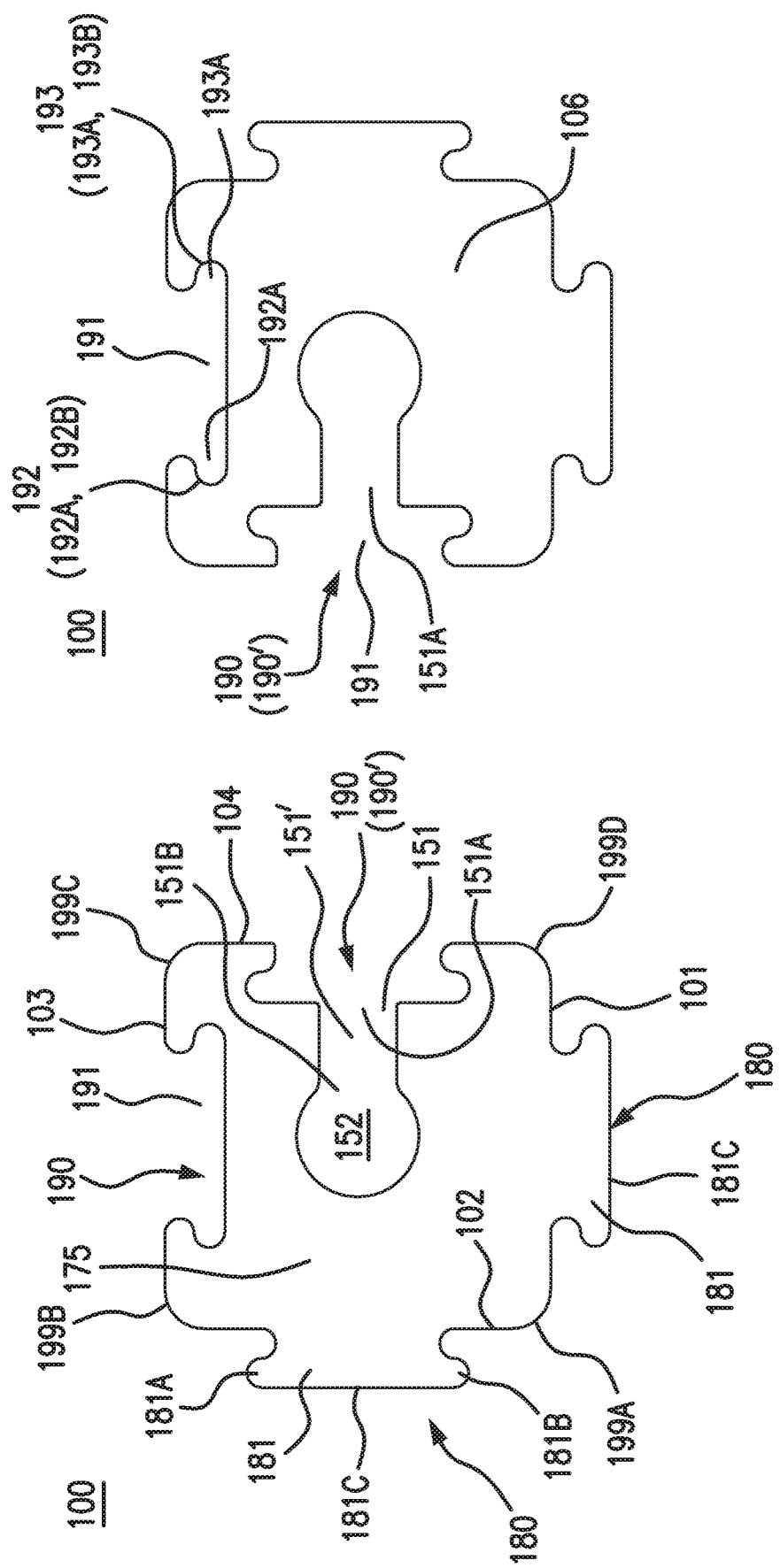

An embodiment of the invention provides a tube retainer comprising a block comprising a top wall; a bottom wall; a first side wall; a second side wall; a third side wall; and a fourth side wall; a first opening comprising a tube slot having a first slot end and a second slot end, and a second opening having a generally annular shape, the first opening communicating with the second opening, the first and second openings passing through the top wall and the bottom wall; wherein at least the first side wall and the second side wall each include a male block connector comprising an outwardly extending member having a first rounded end and a second rounded end, the first rounded end and the second rounded end facing in opposite directions and being spaced from and arranged generally parallel to, the respective side wall; and/or a female block connector comprising a recess comprising a first pocket having an open end and a closed end, and a second pocket having an open end and a closed end, wherein the first pocket and the second pocket are arranged generally parallel to the respective side wall, and the open end of the first pocket faces the open end of the second pocket; wherein the third wall or the fourth wall includes the first slot end of the tube slot.

An embodiment of the invention provides a tube retainer comprising a block comprising a top wall; a bottom wall; a first side wall; a second side wall; a third side wall; and a fourth side wall; a first opening comprising a tube slot having a first slot end and a second slot end, and a second opening having a generally annular shape, the first opening communicating with the second opening, the first and second openings passing through the top wall and the bottom wall; wherein at least the first side wall and the second side wall each include a male block connector comprising an outwardly extending member having a first rounded end and a second rounded end, the first rounded end and the second rounded end facing in opposite directions and being spaced from and arranged generally parallel to, the side wall.

An embodiment of the invention provides a tube retainer comprising a block comprising a top wall; a bottom wall; a first side wall; a second side wall; a third side wall; and a fourth side wall; a first opening comprising a tube slot having a first slot end and a second slot end, and a second opening having a generally annular shape, the first opening communicating with the second opening, the first and second openings passing through the top wall and the bottom wall; wherein at least the first side wall and the second side wall each include a female block connector comprising a recess comprising a first pocket having an open end and a closed end, and a second pocket having an open end and a closed end, wherein the first pocket and the second pocket are arranged generally parallel to the side wall and the open end of the first pocket faces the open end of the second pocket, the recess further comprising a central indentation between the first pocket and the second pocket; wherein the third wall or the fourth wall includes the first slot end of the tube slot.

In some embodiments of the tube retainer, the first side wall and the second side wall each include a male block connector and a female block connector.

A tube retainer according to yet another embodiment of the invention comprises a block comprising a top wall; a bottom wall; a first side wall; a second side wall; a third side wall; and a fourth side wall; a first opening comprising a tube slot having a first slot end and a second slot end, and a second opening having a generally annular shape, the first opening communicating with the second opening, the first and second openings passing through the top wall and the bottom wall; wherein at least the first side wall and the second side wall each include a male block connector comprising an outwardly extending member having a first rounded end and a second rounded end, the first rounded end and the second rounded end facing in opposite directions and being spaced from and arranged generally parallel to, the side wall; and, a female block connector comprising a recess comprising a first pocket having an open end and a closed end, and a second pocket having an open end and a closed end, wherein the first pocket and the second pocket are arranged generally parallel to the side wall, and the open end of the first pocket faces the open end of the second pocket; wherein the third wall or the fourth wall includes the first slot end of the tube slot.

Another embodiment of the invention provides a tube retainer set comprising at least first and second tube retainers.

Yet another embodiment of the invention relates to a tube retainer management system comprising at least one tube retainer, preferably, at least one tube retainer set, and a mounting bar, wherein the at least one tube retainer, or the at least one tube retainer set, is interlockable with the mounting bar.

An embodiment of a tube management system comprises at least one tube retainer according to an embodiment of the invention and/or at least one tube retainer set according to an embodiment of the invention; and, a mounting bar for the at least one tube retainer and/or the at least one tube retainer set, the mounting bar comprising a front wall and at least two female block connectors, each female block connector comprising a recess comprising a first pocket having an open end and a closed end, and a second pocket having an open end and a closed end, wherein the first pocket and the second pocket are arranged generally parallel to the front wall and the open end of the first pocket faces the open end of the second pocket.

In other embodiments, methods of using the tube retainers, tube retainer sets, and tubing retainer management system are provided.

In an embodiment, a method of assembling tube retainers is provided, the method comprising interlocking a first tube retainer including a top wall; a bottom wall; a first side wall; a second side wall; a third side wall; and a fourth side wall; a first opening comprising a tube slot having a first slot end and a second slot end, and a second opening having a generally annular shape, the first opening communicating with the second opening, the first and second openings passing through the top wall and the bottom wall; the first tube retainer comprising at least one male block connector comprising an outwardly extending member having a first rounded end and a second rounded end, the first rounded end and the second rounded end facing in opposite directions and being spaced from and arranged generally parallel to, the side wall; with a second tube retainer with a second tube retainer including a top wall; a bottom wall; a first side wall; a second side wall; a third side wall; and a fourth side wall; a first opening comprising a tube slot having a first slot end and a second slot end, and a second opening having a generally annular shape, the first opening communicating with the second opening, the first and second openings passing through the top wall and the bottom wall; the second tube retainer comprising at least one female block connector comprising a recess comprising a first pocket having an open end and a closed end, and a second pocket having an open end and a closed end, wherein the first pocket and the second pocket are arranged generally parallel to the side wall, and the open end of the first pocket faces the open end of the second pocket; wherein the third wall or the fourth wall includes the first slot end of the tube slot such that the first rounded end and the second rounded end of the outwardly extending member of the at least one male block connector of the first retainer are engaged in the first pocket and the second pocket in the recess of the at least one female block connector of the second retainer.

In a typical embodiment, the method further comprises passing a tube through the tube slot and into the second opening of the first or second tube retainer, preferably the method further comprises passing a first tube through the tube slot and into the second opening of the first tube retainer, and passing a second tube through the tube slot and into the second opening of the second tube retainer.

Advantageously, multiple tubes and/or tubes of different diameters can be safely secured in the tube retainers, tube retainer sets, and tube retainer management system, thus reducing the change of tangling, getting snagged on system components, accidental disassembly, and/or being tripped over. Additionally, tubing can be safely secured without damaging the tubing, and changes in the design of the bioprocessing system and/or temporary hardware in the bioprocessing system can be easily accommodated. The compact design of the tube retainers, tube retainer sets, and tube management system minimizes complexity and size.

Figure 2C:
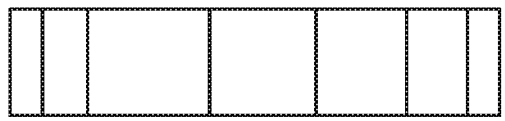
Figure 2F:
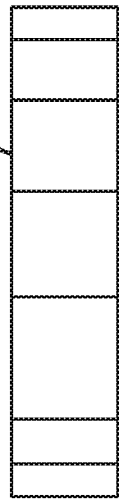
Figure 2E:
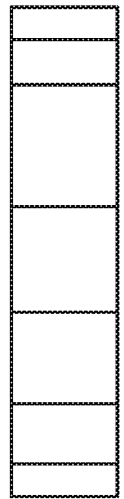
Figure 2D:
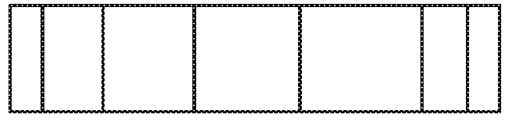

Embodiments of the invention can be utilized with any diameter tubing. While conventional tubing outside diameters are (in inches) $\frac{1}{8}$, $\frac{1}{4}$, $\frac{5}{16}$, $\frac{3}{8}$, $\frac{1}{2}$, $\frac{5}{8}$, $\frac{3}{4}$, 1, and 1.5, other tubing diameters can also be used. Typically, embodiments of tube retainers as shown in FIGS. 1A-1F are used with tubing outside diameters of ⅛ inches to ⁵⁄₁₆ inches, and embodiments of tube retainers as shown in FIGS. 2-2F are used with tubing outside diameters of ⅜ inches or more (e.g., ⅜ inches to ¾ inches).

As used herein, systems including tubing include, for example, bioprocessing systems including fluid transfer lines such as bioreactor systems, buffer management systems, and filtration systems (e.g., involving tangential flow filtration, depth filtration, and/or polishing).

Each of the components of the invention will now be described in more detail below, wherein like components have like reference numbers.

FIGS. 1A-1F show an embodiment of a tube retainer 100 comprising a block 175 comprising a first side wall 101, a second side wall 102, a third side wall 103, a fourth side wall 104, a top wall 105, and a bottom wall 106, and four corners 199A, 199B, 199C, and 199D where the side walls connect with one another. In this illustrated embodiment, the fourth side wall 104 includes a first opening 151 comprising a tube slot 151' having a first slot end 151A and a second slot end 151B, the first opening communicating with a second opening 152 having a generally annular shape, wherein the first and second openings pass through the top and bottom walls.

At least one side wall of tube retainer 100 (preferably, at least two side walls), comprises a male block connector 180 comprising an outwardly extending member 181 having a first rounded end 181A and a second rounded end 181B and a wall 181C between the first and second rounded ends, the first rounded end and the second rounded end facing in opposite directions and being spaced from and arranged generally parallel to, the side wall.

In the embodiment illustrated in FIGS. 1A-1F, first side wall 101 and second side wall 102 each include a male block connector 180 comprising an outwardly extending member 181 having a first rounded end 181A and a second rounded end 181B and a wall 181C between the first and second rounded ends, the first rounded end and the second rounded end facing in opposite directions and being spaced from and arranged generally parallel to, the respective side wall.

At least one side wall of tube retainer 100 (preferably, at least two side walls), comprises a female block connector 190/190' comprising a recess 191 comprising a first pocket 192 having an open end 192A and a closed end 192B, and a second pocket 193 having an open end 193A and a closed end 193B, wherein the first pocket and the second pocket are arranged generally parallel to the respective side wall, and the open end 192A of the first pocket faces the open end 193A of the second pocket. In the illustrated embodiment, the female connector 190' includes a recess 191 wherein the recess also includes the first slot end 151A of the tube slot.

In the embodiment illustrated in FIGS. 1A-1F, third side wall 103 and fourth side wall 104 each include a female block connector, wherein third side wall 103 comprises female block connector 190 comprising a recess 191 comprising a first pocket 192 having an open end 192A and a closed end 192B, and a second pocket 193 having an open end 193A and a closed end 193B, wherein the first pocket and the second pocket are arranged generally parallel to the third side wall and the open end 192A of the first pocket faces the open end 193A of the second pocket, and fourth side wall 104 comprises female block connector 190' comprising a recess 191 comprising a first pocket 192 having an open end 192A and a closed end 192B, and a second pocket 193 having an open end 193A and a closed end 193B, wherein the first pocket and the second pocket are arranged generally parallel to the fourth side wall and the open end 192A of the first pocket faces the open end 193A of the second pocket, wherein the recess also includes the first slot end 151A of the tube slot.

FIGS. 2A-2F show an embodiment of a tube retainer 200, wherein the illustrated embodiment of tube retainer 200 has some similarities to the embodiment of the tube retainer 100 as illustrated in FIGS. 1A-1F. While the embodiment of tube retainer 100 as illustrated in FIGS. 1A-1F has male block connectors and female block connectors separately associated with separate side walls, the embodiment of tube retainer 200 as illustrated in FIGS. 2A-2F has both male block connectors and female block connectors associated the same side wall, preferably, at least two side walls each have at least one male block connectors and at least one female block connector.

FIGS. 2A-2F show an embodiment of a tube retainer 200 comprising a block 275 comprising a first side wall 201, a second side wall 202, a third side wall 203, a fourth side wall 204, a top wall 205, and a bottom wall 206, and four corners 299A, 299B, 299C, and 299D where the side walls connect with one another. In this illustrated embodiment, the fourth side wall 204 includes a first opening 251 comprising a tube slot 251' having a first slot end 251A and a second slot end 251B, the first opening communicating with a second opening 252 having a generally annular shape, wherein the first and second openings pass through the top and bottom walls.

At least one side wall of tube retainer 200 (preferably, at least two side walls), comprises (in addition to a female block connector as discussed below) a male block connector 280 comprising an outwardly extending member 281 having a first rounded end 281A and a second rounded end 281B and a wall 281C between the first and second rounded ends, the first rounded end and the second rounded end facing in opposite directions and being spaced from and arranged generally parallel to, the respective side wall.

In the embodiment illustrated in FIGS. 2A-2F, first side wall 201, second side wall 202, third side wall 203, and fourth side wall 204, each include a male block connector 280 comprising an outwardly extending member 281 having a first rounded end 281A and a second rounded end 281B and a wall 281C between the first and second rounded ends, the first rounded end and the second rounded end facing in opposite directions and being spaced from and arranged generally parallel to, the respective side wall.

At least one side wall of tube retainer 200 (preferably, at least two side walls), comprises (in addition to the male block connector as discussed above) a female block connector 290 comprising a recess 291 comprising a first pocket 292 having an open end 292A and a closed end 292B, and a second pocket 293 having an open end 293A and a closed end 293B, wherein the first pocket and the second pocket are arranged generally parallel to the side wall and the open end 292A of the first pocket faces the open end 293A of the second pocket.

The illustrated embodiment includes at least one female block connector 290' comprising a recess 291 comprising a first pocket 292 having an open end 292A and a closed end 292B, wherein the first pocket is arranged generally parallel to the side wall, and the recess 191 also includes the first slot end 151A of the tube slot, and the female block connector 290' does not include a second pocket.

In the embodiment illustrated in FIGS. 2A-2F, first side wall 201, second side wall 202, and third side wall 203, each include a female block connector 290 comprising a recess 291 comprising a first pocket 292 having an open end 292A and a closed end 292B, and a second pocket 293 having an open end 293A and a closed end 293B, wherein the first pocket and the second pocket are arranged generally parallel to the respective side wall and the open end 292A of the first pocket faces the open end 293A of the second pocket.

In the embodiment illustrated in FIGS. 2A-2F, fourth side wall 204 comprises female block connector 290' comprising a recess 291 comprising a first pocket 292 arranged generally parallel to the side wall, the pocket having an open end 292A and a closed end 292B, wherein the female block connector 290' lacks one pocket as the side wall including the female connector 290' includes the first slot end 251A of the tube slot.

Tubing is inserted in a tube retainer by passing it through the tubing slot into the second opening which has a generally annular shape. The tubing is compressed as it passes through the slot, and expands to its regular diameter once located in the second opening. If desired, the first end of the tube slot can be closed by interlocking the tube retainer with a second tube retainer such that the outwardly extending member closes off first end of the tube slot of the first tube retainer (see, for example, FIG. 6). However, since the tubing has expanded to its regular diameter once within the second opening, even if the first end of the tube slot is not closed, the tubing will not fall out of the tube retainer in the absence of force.

Typically, a plurality of tube retainers are utilized at one time, thus providing a tube retainer set. Tube retainers can be typically pushed and/or snapped together, such that the male block connector(s) engage and interlock with the corresponding female block connector(s).

A tube retainer set can comprise two or more embodiments of tube retainers as illustrated in FIGS. 1A-1F, two or more embodiments of tube retainers as illustrated in FIGS. 2A-2F, and/or at least one embodiment of a tube retainer as illustrated in FIGS. 1A-1F and at least one embodiment of a tube retainer as illustrated in FIGS. 2A-2F.

Figure 3B:
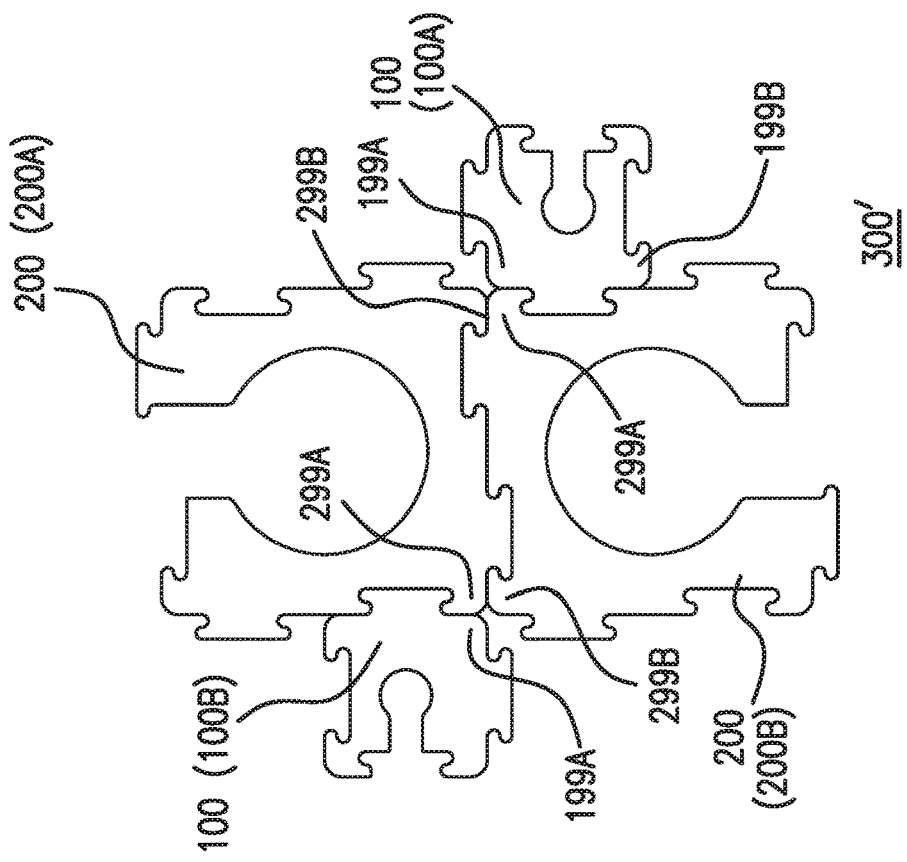
Figure 3A:
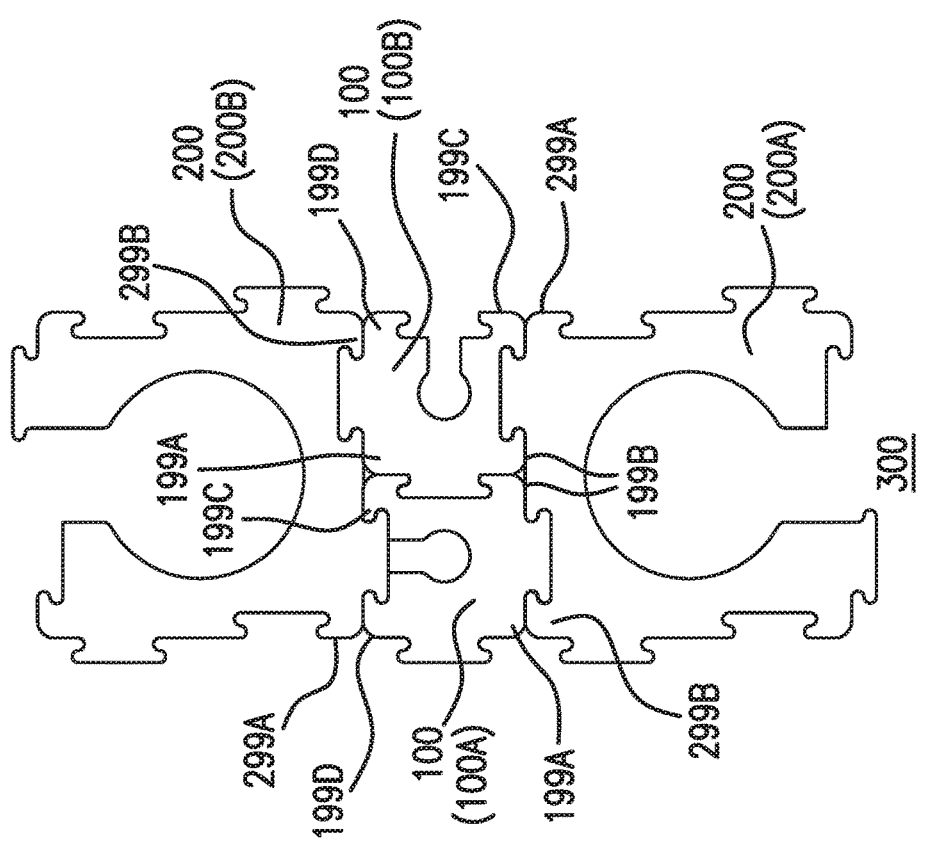

Illustratively, FIGS. 3A and 3B illustrate various embodiments of tube retainer sets. For example, FIG. 3A shows several embodiments of a tube retainer set 300 (including two tube retainers 100 interlocked together), and FIG. 3B shows several embodiments of a tube retainer set 300' (including two tube retainers 200 interlocked together) wherein two or more tube retainers are interlocked in various configurations, e.g., two tube retainers 100 (100A and 100B), or two tube retainers 200 (200A and 200B), or three tube retainers, or four tube retainers.

Figure 5:
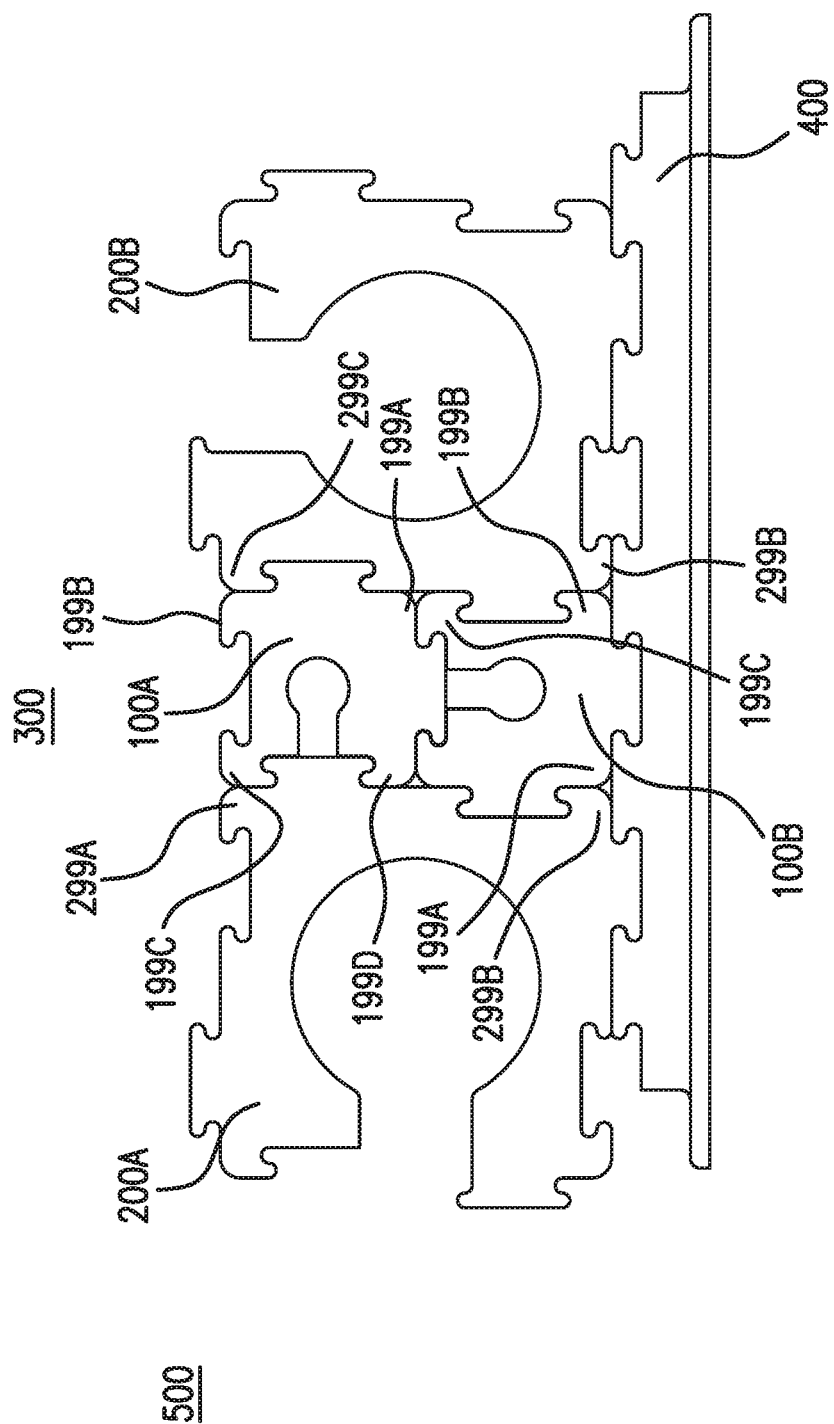
FIG. 5 shows a top view of tube management system including the tube retainer set as generally shown in FIG. 3A interlocked with the mounting bar shown in FIGS. 4A-4D, according to an embodiment of the invention.

With respect to interlocking, as shown in FIGS. 3A, 3B, and 5, the first and second rounded ends of the outwardly extending members of the male connectors of the tube retainers are engaged in, e.g., fit snugly in, the first and second pockets of the female connectors of the tube retainers and of the female connectors of the mounting bar (mounting bar discussed below, see also, FIG. 5). During interlocking, the tube retainers can be slid together in the Z axis. Contact between the outer surfaces of the corners 199A-199D and/or 299A-299D and/or the front wall 401 of the mounting bar assists in maintaining the interlocking between the tube retainers. Tube retainers can be decoupled by sliding in the Z axis.

As shown in FIGS. 3A, 3B, and 5, in forming male block connectors comprising an outwardly extending members having first rounded ends and second rounded ends, the first rounded end and the second rounded end facing in opposite directions and being spaced from and arranged generally parallel to, the side wall, this formation also provides first and second pockets each having open ends and closed ends, and in forming female block connectors comprising first and second pockets each having an open end and a closed end, wherein the first and second pockets are arranged generally parallel to the side wall and the open end of the first pocket faces the open end of the second pocket, this formation also provides first rounded ends and second rounded ends, the first rounded end and the second rounded end facing in opposite directions and being spaced inwardly from and arranged generally parallel to, the side wall, and, when interlocking tube retainers, the formation provides for first and second rounded ends of a first tube retainer fitting snugly into first and second pockets of the second tube retainer.

Figure 6:
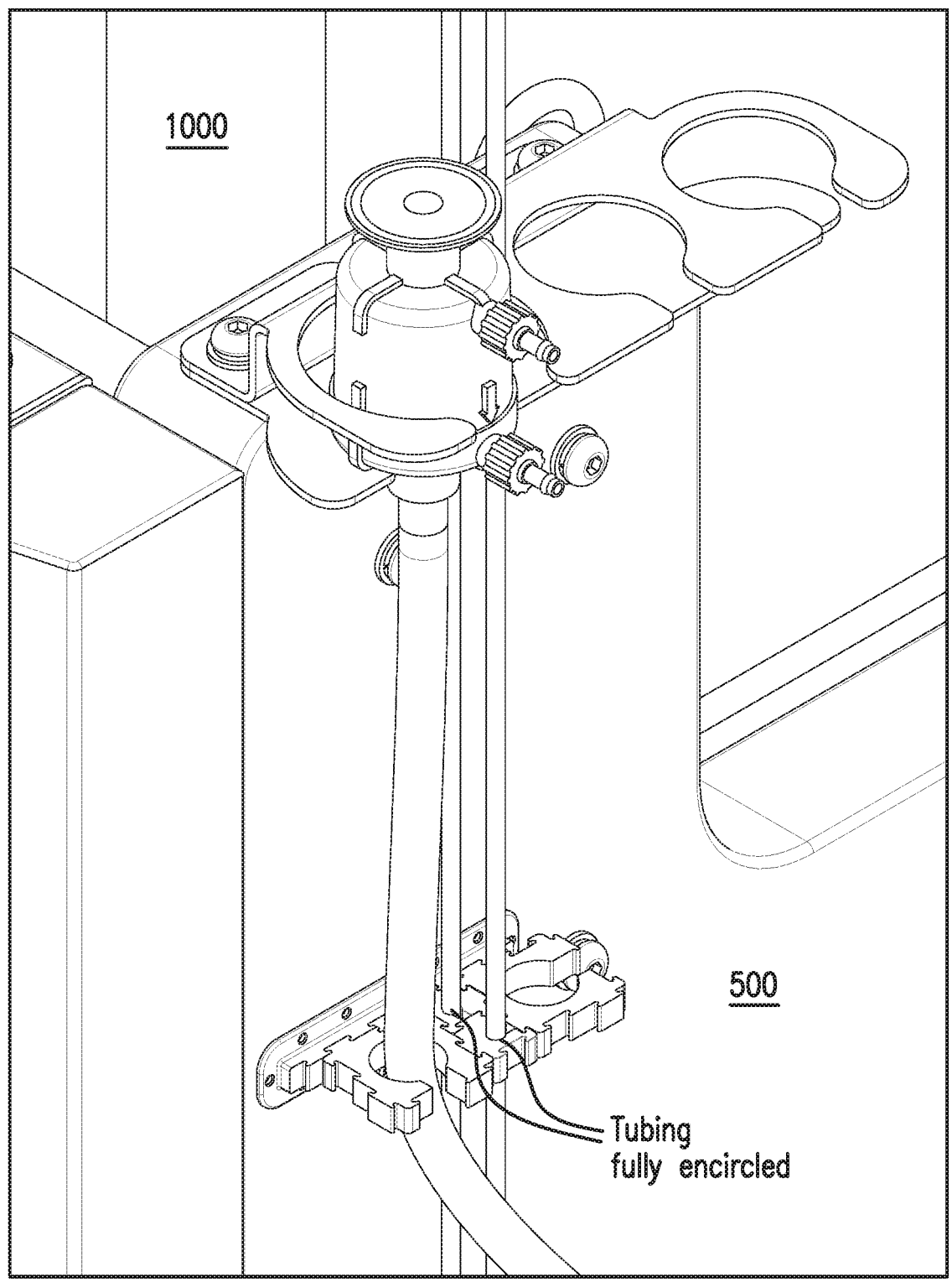
FIG. 6 shows the tube management system shown in FIG. 5 mounted to a bioprocessing system according to an embodiment of the invention.

In some configurations, some of the outwardly extending members of the male connectors of the tube retainers close off the first ends of tube slots (see, for example, the interlocking of tube retainer 100A and tube retainer 200B in FIG. 3A; and the interlocking of tube retainer 100A and tube retainer 100B, and the interlocking of tube retainer 100A and tube retainer 200A in FIG. 5), wherein tubing can be fully encircled by portions of the tube retainers as shown in FIG. 6.

Typically, tube retainers and tube retainer sets are utilized with a mounting bar.

FIGS. 4A-4D show various views of an embodiment of a mounting bar 400, having a front wall 401, a rear wall 403, a top wall 405, and a bottom wall 406, wherein one or more tube retainers and/or tube retainer sets can be interlocked with the mounting bar. Using the embodiment shown in FIGS. 4A and 4B for reference, the illustrated mounting bar includes a front wall 401 having two or more female connectors 490, each female connector 490 comprising a recess 491 comprising a first pocket 492 having an open end 492A and a closed end 492B, and a second pocket 493 having an open end 493A and a closed end 493B, wherein the first pocket and the second pocket are arranged generally parallel to the front wall.

As noted above, embodiments of the invention can be used with a variety of bioprocessing systems. Typically, tube retainers and tube retainer sets are utilized with a mounting bar that can be configured for attachment to a bioprocessing system before or after connection with interlocking tube retainers/tube retainer sets. For example, the mounting bar can include one or more cut outs to allow hanging on an extending pin or screw, or flanges to allow mounting. The embodiment illustrated in FIGS. 4A-4D includes a mounting flange 410, including a plurality of mounting holes 420. Mounting bars can be mounted horizontally (e.g., as shown in FIG. 6), vertically, or at an angle, on, for example, hardware, frame components, and/or stand alone "pylons" (e.g., vertical stands) for bridging gaps between skids.

In accordance with another embodiment of the invention, a tube management system is provided comprising a mounting bar and at least one tube retainer and/or tube retainer set.

For example, FIG. 5 shows an embodiment of a tube management system 500 comprising a mounting bar 400 and a plurality of tube retainers interlocked thereto, wherein the plurality of tube retainers are provided as a tube retainer set 300 (as illustrated in FIG. 3A).

FIG. 6 shows a bioprocessing system 1000 having the embodiment of the tube management system 500 shown in FIG. 5 mounted to the bioprocessing system, also showing tubing of different outside diameters retained in tube retainers having differently sized second openings.

In accordance with embodiments of methods of retaining tubes according to the invention, embodiments of tube retainers and/or tube retainer sets can be interconnected and/or embodiments of the tube management systems can be assembled and tubes can be subsequently placed in the interlocking tube retainers and/or tube retainer sets, or tubes can be placed in interlocking tube retainers that are already interconnected with each other and/or with a mounting bar.

As noted above, embodiments of the invention can be used with a variety of bioprocessing systems. A mounting bar can be attached to a bioprocessing system before or after connection with interlocking tube retainers/tube retainer sets. Mounting bars can be mounted horizontally (e.g., as shown in FIG. 6), vertically, or at an angle, on, for example, hardware, frame components, and/or stand alone "pylons" for bridging gaps between skids.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A tube retainer set comprising at least two tube retainers, each tube retainer comprising:
    a block comprising:
        a top wall;
        a bottom wall;
        a first side wall;
        a second side wall;
        a third side wall; and
        a fourth side wall;
    a first opening comprising a tube slot having a first slot end and a second slot end, and
    a second opening having a generally annular shape, the first opening communicating with the second opening, the first and second openings passing through the top wall and the bottom wall;
    wherein at least the first side wall and the second side wall each include
        a male block connector comprising an outwardly extending member having a first rounded end and a second rounded end, the first rounded end and the second rounded end facing in opposite directions and being spaced from and arranged generally parallel to, the side wall;
        and
        a female block connector comprising a recess comprising a first pocket having an open end and a closed end, and a second pocket having an open end and a closed end, wherein the first pocket and the second pocket are arranged generally parallel to the side wall, and the open end of the first pocket faces the open end of the second pocket;
    wherein the third wall or the fourth wall includes the first slot end of the tube slot;
    wherein the at least two tube retainers are interlocked with each other such that the first rounded end and the second rounded end of the outwardly extending member of the male block connector included in the first or second wall of one of the at least two tube retainers are engaged in the first pocket and the second pocket in the recess of the female block connector included in the first or second wall of the other of the at least two tube retainers and the outwardly extending member of the male block connector included in the first or second wall of one of the at least two tube retainers closes off the first slot end of the tube slot of the other of the at least two tube retainers.

2. A tube management system comprising:
    the tube retainer set according to claim 1, and,
    a mounting bar for the at least two tube retainers, the mounting bar comprising a front wall and at least two female block connectors, each female block connector comprising a recess comprising a first pocket having an open end and a closed end, and a second pocket having an open end and a closed end, wherein the first pocket and the second pocket are arranged generally parallel to the front wall and the open end of the first pocket faces the open end of the second pocket.

3. The tube management system of claim 2, wherein the mounting bar includes a flange for attachment to a bioprocessing system.

4. A method of assembling tube, the tube retainer set comprising at least two tube retainers according to claim 1, the method comprising:
    interlocking the first rounded end and the second rounded end of the outwardly extending member of the male block connector included in the first or second wall of one of the at least two tube retainers such that the first rounded end and the second rounded end of the outwardly extending member of the male block connector is engaged in the first pocket and the second pocket in the recess of the female block connector included in the first or second wall of the other of the at least two tube retainers and the outwardly extending member of the male block connector included in the first or second wall of one of the at least two tube retainers closes off the first slot end of the tube slot of the other of the at least two tube retainers.

5. The method of claim 4, further comprising passing a first tube through the tube slot and into the second opening of the first tube retainer.

6. The method of claim 5, further comprising passing a second tube through the tube slot and into the second opening of the second tube retainer.

7. The method of claim 4, including closing off the first slot end of the tube slot of the second tube retainer with the outwardly extending member of the male block connector included in the first or second wall of the first tube retainer.

* * * * *